US006873609B1

(12) United States Patent
Jones et al.

(10) Patent No.: US 6,873,609 B1
(45) Date of Patent: Mar. 29, 2005

(54) USE OF INTERNET WEB TECHNOLOGY FOR WIRELESS INTERNET ACCESS

(75) Inventors: William J. Jones, Chippenham (GB); Andrew G. Williams, Swindon (GB); Michael Bowring, Stroud (GB)

(73) Assignee: IPWireless, Inc., San Bruno, CA (US)

( * ) Notice: Subject to any disclaimer, the term of this patent is extended or adjusted under 35 U.S.C. 154(b) by 671 days.

(21) Appl. No.: 09/715,558

(22) Filed: Nov. 17, 2000

Related U.S. Application Data

(63) Continuation-in-part of application No. 09/626,699, filed on Jul. 27, 2000, which is a continuation-in-part of application No. 09/432,824, filed on Nov. 2, 1999.

(51) Int. Cl.[7] .............................................. H04Q 7/00
(52) U.S. Cl. ...................... 370/329; 370/252; 709/224
(58) Field of Search ................................. 370/328, 329, 370/252, 437, 401, 230, 254, 336, 343, 411, 439; 709/217, 224, 218, 219, 220, 223, 225; 379/118, 120, 121.06; 455/303, 418, 419, 420, 435.1, 461, 551

(56) References Cited

U.S. PATENT DOCUMENTS

| | | | |
|---|---|---|---|
| 5,638,371 A | | 6/1997 | Raychaudhuri et al. |
| 5,684,791 A | | 11/1997 | Raychaudhuri et al. |
| 5,933,421 A | | 8/1999 | Alamouti et al. |
| 6,047,177 A | | 4/2000 | Wickman |
| 6,064,879 A | | 5/2000 | Fujiwara et al. |
| 6,119,160 A | | 9/2000 | Zhang et al. |
| 6,144,849 A | * | 11/2000 | Nodoushani et al. ........ 455/419 |
| 6,151,628 A | * | 11/2000 | Xu et al. ..................... 709/225 |
| 6,188,899 B1 | | 2/2001 | Chatterjee et al. |
| 6,192,242 B1 | | 2/2001 | Rollender |
| 6,243,372 B1 | | 6/2001 | Petch et al. |
| 6,272,129 B1 | * | 8/2001 | Dynarski et al. ........... 370/356 |
| 6,295,291 B1 | * | 9/2001 | Larkins ....................... 370/352 |

(Continued)

FOREIGN PATENT DOCUMENTS

WO    WO 02/41597 A2    5/2002

OTHER PUBLICATIONS

RFC: 2604, Wireless Device Configuration (OTASP?O-TAPA) via ACAP, Jun. 1999.*
Rigney, C., Radius Accounting, RFC 2059, Jan. 1997, pp. 1–22, http://www.ietf.org/rfc/rfc2059.txt?number=2059.
Rigney et al., Radius, RFC 2138, Apr. 1997, pp. 1–22, http://www.ietf.org/rfc/rfc2138.txt?number=2138.
RFC:2604, Wireless Device Configuration (OTASP?O-TAPA) via ACAP, Jun. 1999.
Rigney, C., Radius Accounting, RFC 2139, Jun. 2000, pp. 1–25, http://www.itef.org/rfc/rfc2866.txt?number=2866.

*Primary Examiner*—John Pezzlo
(74) *Attorney, Agent, or Firm*—Morrison & Foerster LLP

(57) ABSTRACT

Internet web technology is used to allow a wireless Internet customer to acquire a virtual subscriber identity module (VSIM) in an anonymous session connection and then transfer the VSIM to any other desired PC (personal computer).

3 Claims, 3 Drawing Sheets

U.S. PATENT DOCUMENTS

| | | | |
|---|---|---|---|
| 6,324,402 B1 * | 11/2001 | Waugh et al. | 455/445 |
| 6,334,057 B1 | 12/2001 | Malmgren et al. | |
| 6,351,458 B2 | 2/2002 | Miya et al. | |
| 6,370,384 B1 | 4/2002 | Komara | |
| 6,373,831 B1 | 4/2002 | Secord et al. | |
| 6,374,112 B1 | 4/2002 | Widegren et al. | |
| 6,377,955 B1 | 4/2002 | Hartmann et al. | |
| 6,381,454 B1 * | 4/2002 | Tiedemann et al. | 455/419 |
| 6,400,966 B1 | 6/2002 | Andersson et al. | |
| 6,421,714 B1 * | 7/2002 | Rai et al. | 709/217 |
| 6,453,414 B1 * | 9/2002 | Ryu | 713/2 |
| 6,490,667 B1 * | 12/2002 | Ikeda | 711/163 |
| 6,515,989 B1 | 2/2003 | Ronneke | |
| 6,571,290 B2 | 5/2003 | Selgas et al. | |
| 6,587,684 B1 * | 7/2003 | Hsu et al. | 455/419 |
| 6,628,671 B1 | 9/2003 | Dynarski et al. | |
| 6,628,934 B2 * | 9/2003 | Rosenberg et al. | 455/411 |
| 6,675,208 B1 * | 1/2004 | Rai et al. | 709/224 |
| 6,714,931 B1 | 3/2004 | Papierniak et al. | |
| 6,718,332 B1 | 4/2004 | Sitaraman et al. | |
| 2001/0001268 A1 | 5/2001 | Menon et al. | |

* cited by examiner

USE OF INTERNET WEB TECHNOLOGY FOR WIRELESS INTERNET ACCESS This is a continuation-in-part of application Ser. No. 09/626,699, filed Jul. 27, 2000, entitled "USE OF INTERNET WEB TECHNOLOGY TO REGISTER WIRELESS ACCESS CUSTOMERS" which is a continuation-in-part Ser. No. 09/432,824, filed Nov. 2, 1999, entitled, "CELLULAR WIRELESS INTERNET ACCESS SYSTEM USING SPREAD SPECTRUM AND INTERNET PROTOCOL (IP)."

INTRODUCTION

The present invention is directed to the use of Internet web technology for wireless customer Internet access AND specifically to allow authenticated Internet access for more than one personal computer.

BACKGROUND OF THE INVENTION

Both of the above applications describe a cellular wireless Internet access system which operates in the 2 gigahertz or other frequency bands to provide high data rates to fixed and portable wireless Internet devices. Such users connect to near-by base stations which in turn communicate to Integrated Network Controllers which are then connected to the Internet. Such wireless implementation relates to an access network of the UMTS (Universal Mobile Telephone Service) and its subset UTRAN (Universal Terrestrial Radio Access Network) standards.

In order to gain service in a cellular wireless network of the types similar to the above, a sales representative at a retail location typically takes customer information, credit card number and credit history, etc. That information is used to create an account with a cellular service provider, with the customer information stored on the service provider's Home Location Register (HLR) or other customer database. A SIM (Subscriber Identity Module) card is then associated with the account and placed within the cellular terminal (typically, a mobile phone or wireless Internet device).

Both of the above techniques are cumbersome, requiring action on the part of the retailer or network service provider, and creating a time delay before a new customer can use the service.

Application Ser. No. 09/626,699, allows the user to self-register to gain access to Internet services for the wireless system as above. It is, however, also desired to allow authenticated access to be provided for various user access units.

OBJECT AND SUMMARY OF INVENTION

It is therefore an object of the present invention to provide an improved method for allowing customer access in a wireless Internet system.

In accordance with the above object there is provided a method of operating a cellular wireless Internet access system as part of an Internet Network where users have personal computers (PCs) and each user utilizes a portable user equipment (UE) typically with a directly attached antenna for communicating in a wireless manner on a cellular network with an integrated network controller, the UE being connected to the PC, the network having a registration web server and an access operator authentication server. The method comprises the following steps:

A PC and associated UE are used to register with a registration web server on the Internet Network via an open connection to the network including downloading subscriber identity information from the registration web server to the PC via the UE for storage in the PC. The subscriber identity information includes, at least, a unique user identification (user ID) and a permanent password. Such stored information constitutes a virtual subscriber identity module (VSIM). The access operator authentication server is updated with the user ID and password. The user may then be connected to an allowable Internet service provider (ISP) using the VSIM. Another PC may be used by transferring electronically the user ID and password to the other PC via a portable magnetic storage means, a local area network (LAN), an e-mail attachments, or an electronic transferable file.

BRIEF DESCRIPTION OF THEE DRAWINGS

DETAILED DESCRIPTION OF PREFERRED EMBODIMENT

Figure 1:
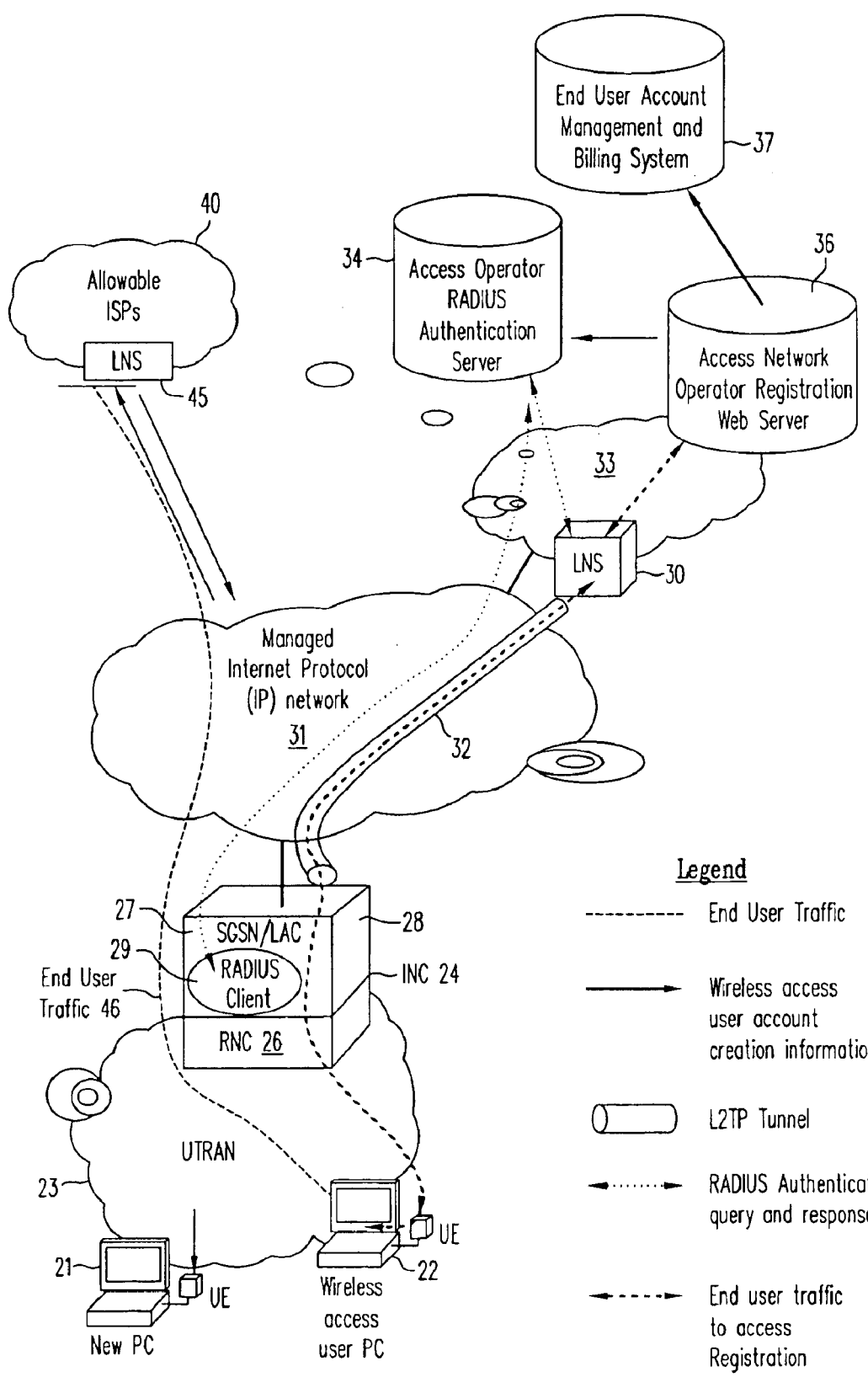
FIG. 1 is a block diagram of an Internet system illustrating the present invention.

Referring now to FIG. 1, there is illustrated a wireless access user with user equipment (UE) 22 connected by a typical data connection to the personal computer (PC). The personal computer has a CD drive or similar media input device with a special compact disc containing software, including a wizard (that is the instructional system procedures for registration) which is placed in the CD drive. In addition, a second PC and UE 21 is illustrated, a new PC whose function in the Internet Network system shown in FIG. 1 will be described below.

Both the UE and CD of system 22 are acquired and purchased at some retail location or by mail. This is described more fully in the above '699 application involving registration. PC 22 and its associated UE as described in the above application Ser. No. 09/432,824, are a part of a UMTS/UTRAN system which by many wireless techniques (a specific novel one is described in the above application) communicates in a wireless manner via a UTRAN network as indicated by the symbol 23 to an Integrated Network Controller (INC) 24. Such controller may be connected by wireline or otherwise to an Internet Protocol (IP) Network 31. As discussed in the above pending application, the Integrated Network Controller 24 includes an RNC or Radio Network Controller 26 which controls and allocates the radio network resources and provides reliable delivery of user traffic between a base station (described in the above pending application) and User Equipment (UE) and eventually the Integrated Network Controller (INC) 24. An SGSN (Serving General Packet Radio Service Support Node) 27 provides session control and connection to the Access Operator Radius Authentication Server 34. Lastly, LAC 28 (layer 2 Tunneling Protocol Access Concentrator) provides the gateway functionality to the allowable Internet Service Providers (ISP) 40 and to the registration server 36. A Layer 2 Tunneling Protocol Network Server (LNS) 30 terminates communication tunnels from the LAC through the IP network. The Access Operator Radius Authentication Server 34 supports the Home Location Register (HLR) functionality (described in the above pending application). The Access Operator Registration Server 36 provides the facilities for a new user to register.

The Integrated Network Controller 24 also illustrates that it incorporates a "RADIUS" client 29. RADIUS is a system including the software that supports centralized access control for Internet access, which, as discussed above, is traditionally used where the access to the Internet is via the public switched telephone network. A description of RADIUS is provided by an article RFC2138 Remote Authentication Dial-in User Service (RADIUS) by C. Rigney, et al., April 1997.

In all cases of communication of a user equipment 21 or 22 through the Internet Protocol Network, illustrated as 31, authentication is performed by the user equipment (UE) signaling the customer's wireless access authentication information which is passed over the air to Integrated Network Controller 24 which queries a RADIUS authentication server with the user ID (identification) and temporary password. The RADIUS authentication server used is the Access Operator's RADIUS Authentication Server 34 which communicates with the Integrated Network Controller via the IP network using UDP/IP protocols with additional protocol layers for security.

In the case of a new user, a 'new user' ID and temporary password, preprogrammed in the CD software, is signaled to the Access Operator RADIUS Authentication Server 34 via the INC 24. The Access Operator RADIUS Authentication Server 34 recognizes the user as a 'new user' and communicates a set of protocol filters to the INC 24 that results in a PPP (Point-to-Point Protocol) session being set up between the User's PC and the Access Operator's Registration Server 36 via the Layer 2 Tunneling Protocol communication link 32 and bars the user from accessing any other service. The Access Operator's Registration Server 36 is connected to the subscriber account management and billing system 37.

Thus, the foregoing constitutes the open session link where a general or non-authenticated user can still gain access to the wireless access operator's registration server for the purpose of new-user registration. The accompanying legend indicates the various paths. A UMIS access network 33 operator provides the special servers 34 and 36 along with the billing system 37.

Figure 3:
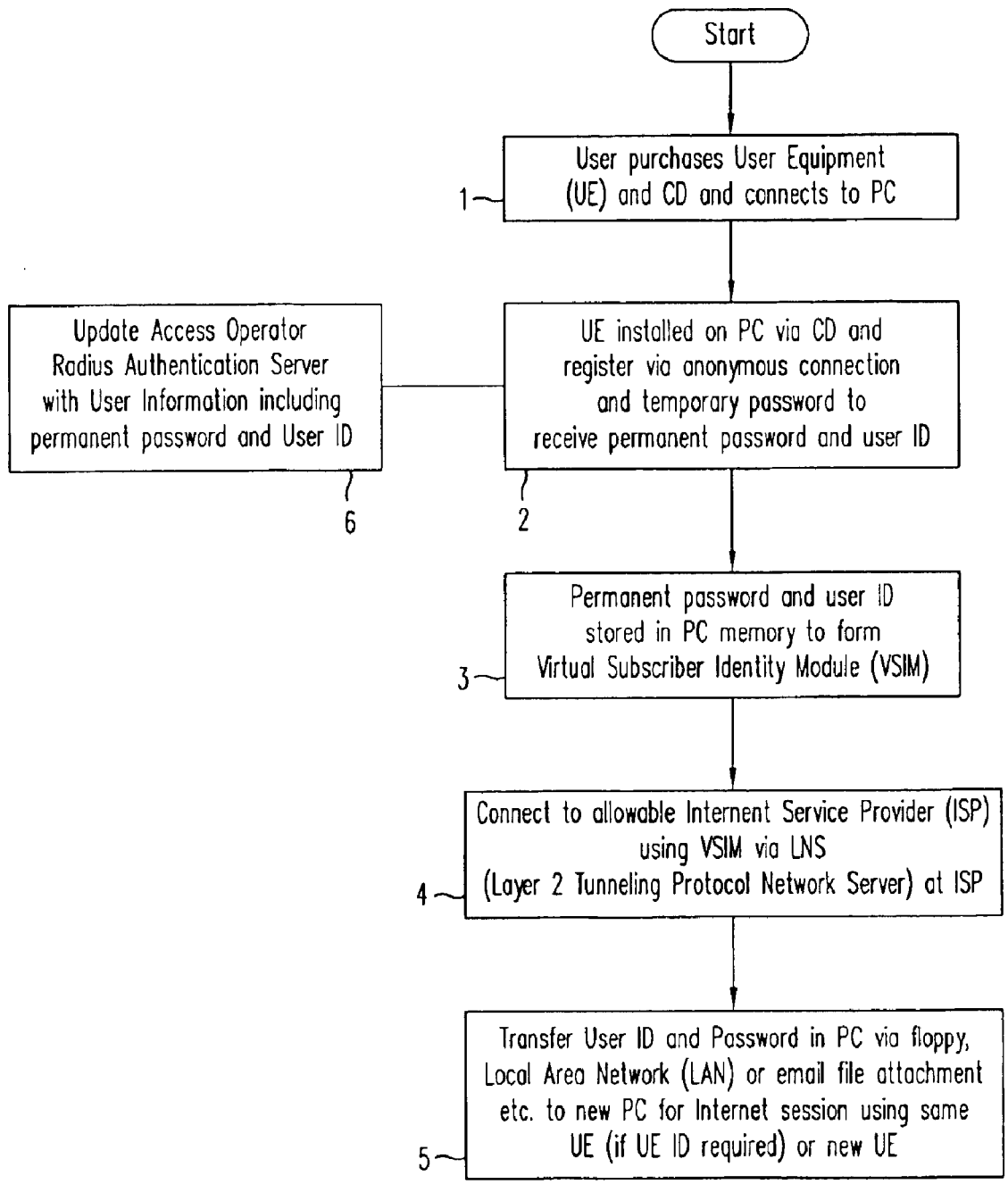
FIG. 3 is a flowchart showing the operation of the invention.

The flow chart of FIG. 3 describes in somewhat truncated detail the registration procedure set out in greater detail in the above co-pending '699 application. After "START" in Step 1, the user purchases the user equipment UE which may or may not have a particular unique identification number (ID) and a CD with the appropriate software and wizard feature installed on it. This is connected to the PC. Next in Step 2, the user equipment is installed on the PC via the wizard instructions on the CD, along with a new user ID and temporary password which were contained on the CD. These are then sent to the UE. The UE sends this authentication information over the air to the RNC 26, which is passed onto the RADIUS Client 29 and the SGSN 27 which queries the RADIUS server 34 with a new user ID and temporary new user password. In effect, an open connection using the temporary password is made on the Internet and as described in the above co-pending application, a permanent password is generated along with a user ID. As indicated in Step 3, this is stored in the PC memory of the unit 22. Thus, the permanent password and ID which have been electronically stored in the PC memory (which may be a randomly accessible memory or floppy disk or hard disk) form a virtual subscriber identity module or VSIM. At the same time (Step 6), the RADIUS server 34 is updated with the user's name and permanent password to provide subsequent access to allowable ISPs 40, as illustrated in FIG. 1. Thus, as described in the above co-pending application, access has been gained to the Internet Network on a special open connection. Thus, as described in Step 4, connection may now be made to allowable Internet service providers (ISPs) using the VSIM user information via the Layer 2 Tunneling Network Server (LNS) 45 of the allowable ISPs 40. This route is shown in a dashed line designated End User Traffic 46.

Figure 2:
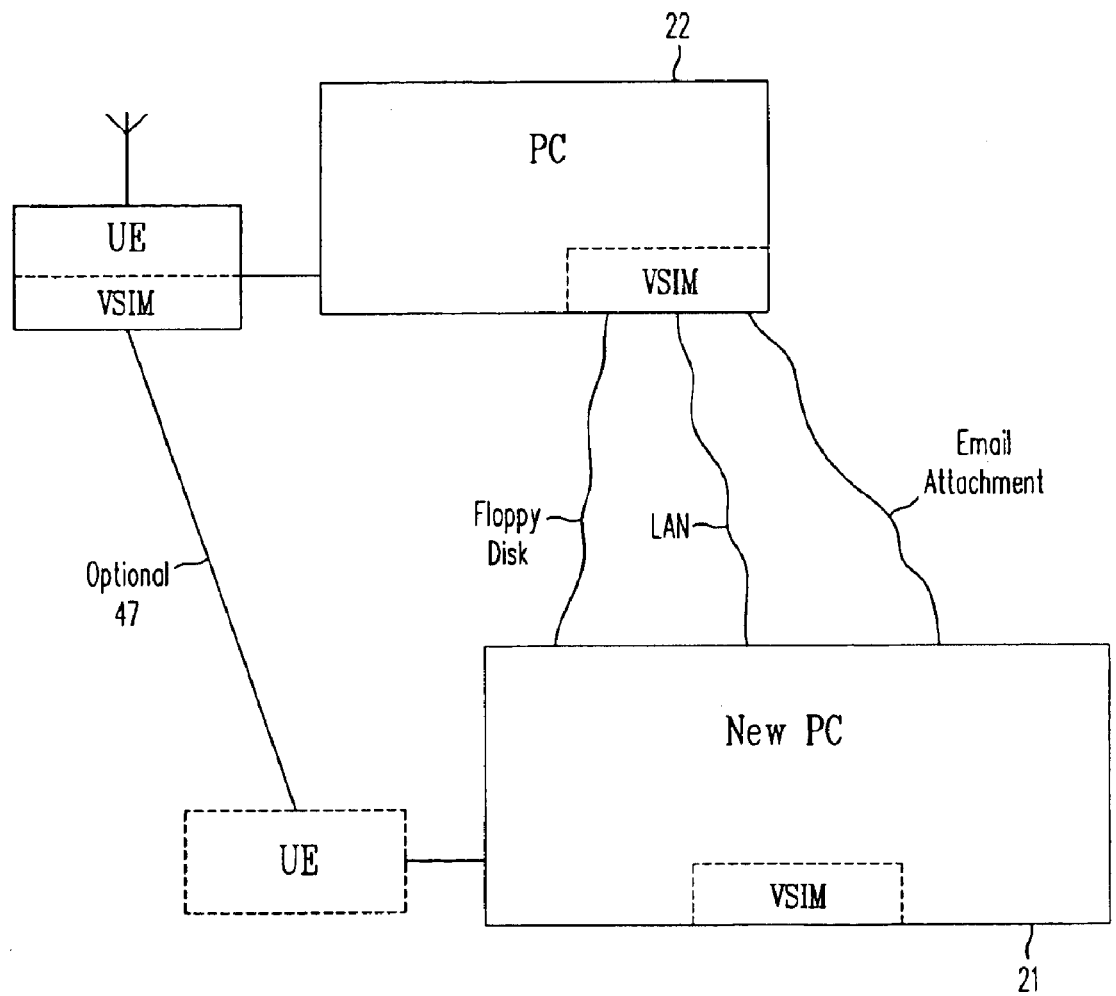
FIG. 2 is a schematic block diagram illustrating the present invention.

With the VSIM, in accordance with the present invention, as shown in Step 6, a user may electronically transfer the subscriber identity information to a new or another PC, for example, indicated as 21 in FIG. 1 This is illustrated in FIG. 2 where the original PC 22 with the VSIM subscriber identity module information indicated in dashed outline transfers the VSIM information via one of the following electronic techniques so designated: floppy disk, LAN (Local Area Network), e-mail attachment or other electronic means. Thus, the new PC 21 contains the VSIM information so designated in the dashed block as VSIM and may access the Internet Network. Optionally, if as part of the VSIM or subscriber identity information, the unique identification or ID of the associated UE with PC 22 is part of the VSIM information, then as shown by the optional line 47 the UE must be transferred to the new PC 21. This prevents use by more than one subscriber; in other words, it is further protection against fraud. However, this is not necessary if the user equipment ID is not a part of the required VSIM information.

Thus, with the foregoing the new PC 21 may now access the Internet Network. In summary the VSIM may manifest itself as the file on the hard disk of the personal computer being used for Internet Access, or as an alternative, be stored on a floppy disk or other removable media. In the case of the VSIM being stored on a floppy disk the end user may take that disk to a new or different computer connected to a new or different UE and gain wireless access to the Internet. Moreover, if the VSIM information is not encrypted, it can be retrieved and manually recorded by the user for transfer to another computer.

Authentication and accounting is provided for against the identifying information of their VSIM. Other typical functions of a subscriber identity module (SIM) may be provided in addition to the unique ID, a customer password, and UE equipment identifier. This may include storage of an access network operator name, an Internet service in provider name, encryption of all of the above data, provision of all of the above data on demand to associated subscriber equipment to an access network operator, or on demand to an ISP.

In conclusion, with the use of the VSIM as described above in a mobile or portable wireless system, such information is transportable in this electronic format from one computer to another. Moreover, it is stored in the user's PC or personal computer rather than the separate user equipment or subscriber unit (such as a cellular telephone).

What is claimed is:

1. A method of operating a cellular wireless Internet access system as part of an Internet Network where users have personal computers (PCs) and each user utilizes a portable user equipment (UE) typically with a directly attached antenna for communicating in a wireless manner on a cellular network with an integrated network controller, the UE being connected to a PC, said network having a registration web server and an access operator authentication server, the method comprising the following steps:

using said PC and UE to register with said registration web server on said Internet Network via an open connection to said network including downloading subscriber identity information from said registration web server to said PC via said UE for storage in said PC, said subscriber identity information including, at least, a user identification (user ID) and a password, such stored information constituting a virtual subscriber identity module (VSIM);

updating said access operator authentication server with said user ID and password;

connecting on said PC to an allowable Internet service provider (ISP) using said VSIM; and transferring electronically said user ID and password to another PC, via a temporary transfer to a portable magnetic storage means, a local area network (LAN), an e-mail attachment, or an electronic transferable file to enable said another PC to connect to the allowable ISP.

2. A method as in claim 1 where said UE has an ID and is included as part of said subscriber identity information whereby the UE is connected to said another PC to enable an Internet session.

3. The method of claim 1 wherein said transferred user ID and password forms the VSIM on said another PC.

* * * * *